Figure 1:
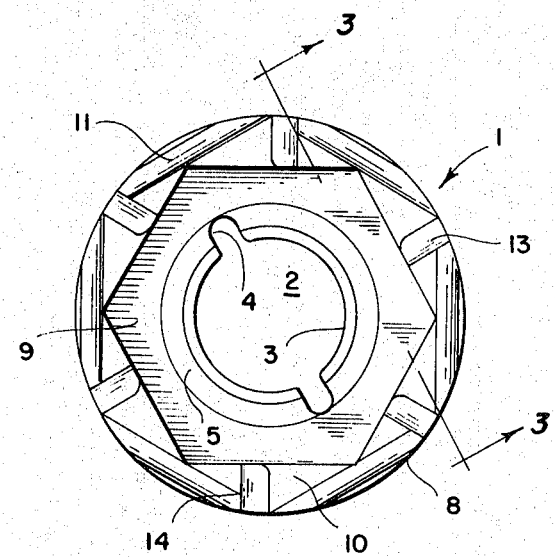

United States Patent

[11] 3,545,332

| [72] | Inventor | George A. Tinnerman<br>Lakewood, Ohio (3600 Stewart Ave., Miami, Florida 33133) |
|---|---|---|
| [21] | Appl. No. | 783,880 |
| [22] | Filed | Dec. 16, 1968 |
| [45] | Patented | Dec. 8, 1970 |

[54] THREADED FASTENER FORMATION
6 Claims, 3 Drawing Figs.
[52] U.S. Cl. .................................................. 85/62,
85/32; 151/37
[51] Int. Cl. ..................................................... F16b 31/04,
F16b 39/282
[50] Field of Search ......................................... 85/32, 62,
32(INT.), 32(T); 151/37, 38, 34

[56] References Cited
UNITED STATES PATENTS

| 1,952,305 | 3/1934 | Beck | 151/37 |
|---|---|---|---|
| 2,112,494 | 3/1938 | Olson | 151/37 |
| 2,833,326 | 5/1958 | Knohl | 151/37 |
| 3,075,272 | 1/1963 | Buyken | 85/32(INT.)X |
| 3,137,197 | 6/1964 | Meyer | 85/32(INT.) |

*Primary Examiner*—Ramon S. Britts
*Attorneys*—Revere B. Gurley and Arthur H. Van Horn

ABSTRACT: The clamping face of a nut is formed with a raised, rounded portion to provide rounded surface contact and reduce initial friction, and sharp projections to engage the member clamped to increase torque resistance when the applied torque is excessive. This formation may be applied specifically to the skirted wall of the nut which provides a cavity for a sealing compound.

PATENTED DEC 8 1970

3,545,332

INVENTOR
GEORGE A. TINNERMAN

BY Revere B Gurley

ATTORNEY

THREADED FASTENER FORMATION

NATURE OF INVENTION

This invention relates to a nut or other fastener element having a clamping face which engages a member upon relative rotation to clamp said member by the action of a screw threaded engagement. The invention lies in arranging raised, rounded portions or protuberances on the clamping face to reduce friction sufficiently on initial engagement with the clamped member that the available torque on the fastener will produce the requisite clamping force, while, at the same time, providing for increased resistance to rotation under high torque to prevent failure of the thread formation if the torque is excessive.

To illustrate graphically the advantages of this invention, applicant was confronted with an automotive assembly which required a clamping force by the nut of approximately 500 pounds minimum, the nut being tightened by an assembly line tool with a seating torque of 65 to 75 pounds inch. With a large, flat surface area of contact, or a sharp contact, the clamping force was only 100 to 200 pounds at this torque.

Applicant provided rounded protuberances on the face of the nut, which provided line or surface contact and reduced the frictional engagement sufficiently that the 65 to 75 pounds inch of the torque wrench provided the 500 pounds clamping force. With these wrenches and under these conditions, the problem of sufficient clamping force was solved.

But if abnormal conditions occurred, failures were still possible. Torque wrenches are not always accurately calibrated, and may apply a torque as high as 100 pounds inch. Such high torque applied to the nut with its reduced frictional resistance caused the threads to strip and the nut to fail. Applicant overcame this difficulty by adding sharp or toothed projections substantially as high as the rounded protuberances, so that initially the projections would barely engage, but as the pressure increased, the toothed projections would bite into the surface of the clamped member and offer high resistance to rotation. As a result, any excessive torque by the torque wrench was met by a high resistance to rotation, preventing failure of the threads of the nut. In fact, the torque could go as high as 120 to 130 pounds inch before stripping of the threads, in contrast to stripping at 80 pounds inch without the teeth.

This nut has proved capable of providing the required clamping force under the torque encountered on the assembly line, even if the normal operating torque is exceeded by improperly calibrated tools. The result of the conjoint association of the rounded protuberances to reduce the initial resistance, so that a high clamping force is attained, and the sharp projections to resist excessive torque which might cause failure of the threads, is a satisfactory clamping nut which is especially adapted for use on the assembly line.

DRAWINGS

Figure 2:
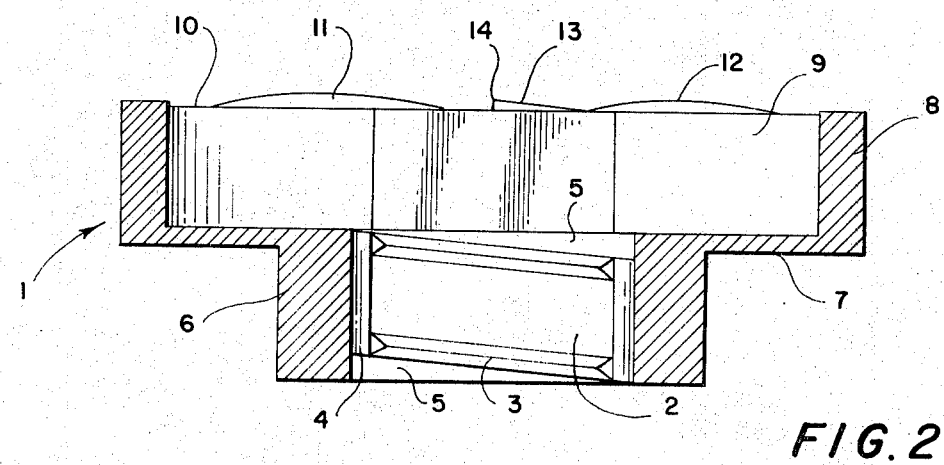
Figure 3:
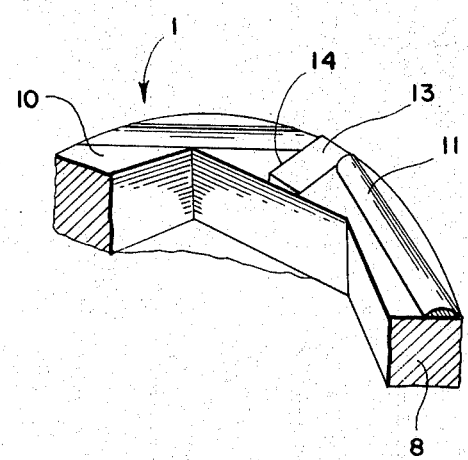

A nut according to this invention is shown in the drawings, in which:

FIG. 1 is a bottom plan view of the nut, showing the clamping face;
FIG. 2 is a central axial section of the nut of FIG. 1; and
FIG. 3 is a fragmentary sectional view on line 3—3 of FIG. 1.

DESCRIPTION

The invention is illustrated as embodied in a nut or fastener element 1 having an aperture 2 with thread formation 3 on its wall to engage a shank for the threading on to the shank. The thread formation 3 in this instance is shown as thread or groove cutting ribs of the type shown in applicant's application Ser. No. 723,163, Preformed Groove Cutting Fastener.

The wall of the aperture has axial grooves or discontinuities 4, and extending between these grooves, the preformed helical surfaces 5 at each end. The ribs or threads 3 are shaved or swaged from the ends of the walls at their intersection with the preformed surfaces 5 as described in said application. The external surface 6 of the apertured portion is hexagonal to accommodate a conventional tool.

The base portion 7 of the nut is formed as a skirt portion of larger diameter having a depending wall 8 to leave an internal cavity 9, which may receive sealing material. The end of the wall provides a clamping face 10 to engage a member to be clamped and held by the fastener element when threaded on a cooperating shank.

The clamping face 10 has a raised, rounded formation or rounded protuberances 11, shown as circumferentially extending ribs tangential to a circle coaxial with the aperture 2. The surface 12 of each protuberance 11 is transversely curved as shown in FIG. 3.

The clamping face 10 is also provided with several sharp projections 13 extending radially. Each projection has a radial edge 14 to form a tooth and the sharp edge of the projection faces the direction of rotation when tightening the nut, as shown in FIG. 3.

These projections are the same or approximately the same axial height as the curved protuberances, although in some instances it has been found that they may differ slightly in height, i.e., on the order of one or two thousandths of an inch. When the nut is threaded on a metal stud, as described above, the teeth may be of slightly less height, so that the ribs engage first and the teeth then engage after considerable clamping force has been exerted. On the contrary, it has been found that when used with a plastic stud, it is desirable to reduce the torque force of the wrench more quickly and for this reason the teeth may be made higher than the ribs, so as to slow down the torque wrench on its initial engagement and avoid damage to the stud.

While the forms of the rounded protuberances and sharp projections are the most effective so far investigated, the same principle would apply to other shapes having the respective characteristics of a rounded surface contact and sharp, toothed engagement. Thus the rounded surfaces may be on a continuous rib or ribs, or on separate, individual localized areas. Similarly, the toothed projections may be single points or elongated edges. All these equivalent formations can be employed for this purpose, the most effective in any particular fastener being determined by actual tests.

This formation of the clamping face of a fastener element has been shown on the end wall of the skirt of a nut, the skirt providing a cavity which may retain a sealing compound. The protuberances shown as circumferentially spaced, also allow the escape of any sealing compound subjected to unusual pressure, while the rounded surface contact provides for high clamping force. Such a nut may be used to replace the usual sealing nut with a curved washer staked on the nut body to retain the sealing compound and to reduce the torque resistance of the nut which rotates on the washer. The single nut body of this invention performs the same functions as the present two part fastener, and is simpler and cheaper to construct.

While this invention has special advantages when applied to the skirted nut shown, the same principle of the rounded protuberances associated with the sharp projections may be applied to any fastener in which a threaded element engages a relatively rotatable member. The clamping face of a bolt or screw, or the face of a washer to be used in cooperation with a threaded member, may also be provided with a clamping face of the same form. In any of these elements, there is obtained the advantages of high clamping force and sufficient torque resistance to high torque force to prevent failure of the fastener.

I claim:
1. A threaded fastener element having a clamping face to engage a member to be clamped by the fastener upon relative rotation, a plurality of rounded protuberances of uniform height on said face to provide a total area of reduced engagement with said member to be clamped, said rounded protuberances defining a smooth rounded surface over every portion thereof and being generally symmetrically arranged circum- ferentially of said clamping face, and a plurality of sharp projections on said face substantially as high as said protuberances to bite into said surface on said member to be clamped when said fastener is tightened.

2. A fastener element as claimed in claim 1, in which said rounded protuberances extend tangentially to a circle coaxial to said element.

3. A fastener element as claimed in claim 1, in which said sharp projections extend radially of said element.

4. A nut comprising an apertured body portion having a circumferential skirt portion extending axially from said body portion and of larger diameter to provide a cavity within said skirt portion, the axial end of said skirt portion having a coaxial transverse clamping face, said clamping face being formed with a plurality of slightly raised, rounded protuberances of uniform axial height, said rounded protuberances being generally symmetrically arranged circumferentially of said clamping face, and a plurality of sharp projections of substantially the same axial height as said rounded protuberances.

5. A nut as claimed in claim 4, in which said rounded protuberances extend tangentially to a circle coaxial to said nut and are spaced about the periphery of said skirt portion and said sharp projection projections extend radially between said protuberances.

6. A fastener element having a coaxial transverse clamping face for use in a threaded fastener assembly in cooperation with a relatively rotatable member having a cooperating coaxial transverse clamping face, said element and member being relatively axially movable by threads on one of said members to engage said clamping faces, one of said clamping faces having a raised formation of substantially uniform height defining a smooth, rounded surface over every portion thereof and being substantially smaller in area than the area of said face and symmetrically arranged about the axis of the clamping face adjacent the periphery to provide a smooth, curved surface engagement with the opposing surface, and a plurality of sharp projections of substantially the same height as said rounded surface formation on said one of said clamping faces forming teeth having edges extending along radial lines and facing in the direction of relative rotation of said faces upon clamping movement so that said teeth bite into the opposite clamping face to resist rotative clamping movement.